Aug. 27, 1957 J. HOBBS 2,804,057
WATER HEATER AND STEAM BOILER SYSTEM
Filed July 3, 1952
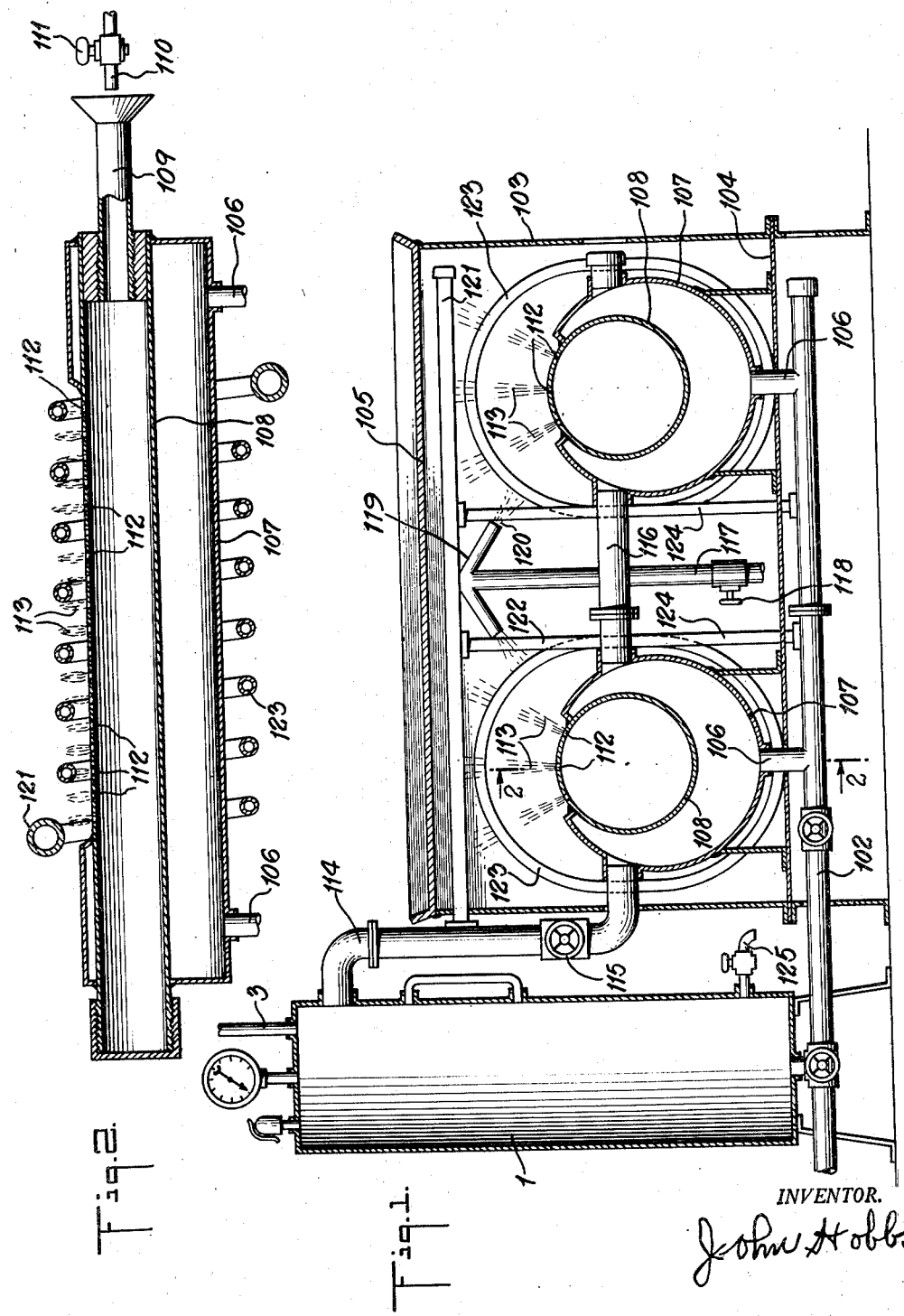
INVENTOR.
John Hobbs

2,804,057
WATER HEATER AND STEAM BOILER SYSTEM

John Hobbs, New York, N. Y.

Application July 3, 1952, Serial No. 297,002

5 Claims. (Cl. 122—20)

My present invention relates to water heaters, steam boilers and gas heating means, and especially to water heaters and gas heating systems combined.

The main object of my invention is to preheat water in a water heating system by recovering heat from the flue gases traveling to a chimney from a furnace while utilizing an additional source of heat by special means characteristic of the invention.

An ancillary object is to add heat to the system by using steam passing through coil means associated with the flue pipe extending to the chimney.

A further object is to have a heating system designed along the lines indicated that is capable of using various sources of heat for the furnace involved and yet including the main principles of heat recovery forming an important feature of my invention.

It is thus an object, withal to have such a heating system that is economical in the use of heat and therefore very efficient in operation.

Other objects and advantages of my invention will appear in greater detail as the specification proceeds.

In order to facilitate ready comprehension of this invention for a proper appreciation of the salient features thereof, the invention is illustrated on the accompanying drawings forming part hereof, and in which:

Figure 1 is a vertical section of a water preheating system and gas heating means therefor made according to the invention and embodying the same in practical form;

Figure 2 is a longitudinal vertical section of one gas heater and coil of Figure 1 as taken on line 2—2 therein.

Throughout the views, the same reference numerals indicate the same or like parts.

It is a well known fact that in practically all water and steam heating plants and apparatus, and even hot air heating systems, a great deal of heat is lost, largely escaping up the chimney and therefore being wasted to an appalling extent. Upon considering this problem, it has occurred to me that means should be available for recovering heat from the flue gases passing up to the chimney by preheating water or other fluid by means of these gases so that less heat will then be required to bring the temperature of the fluid up to the required point for use. As a result, I have succeeded in producing water heating means and the like along the lines already mentioned, as will now be set forth in detail in the following.

Hence, in the practice of my invention, and referring also again to the drawings, in Figures 1 and 2, the tank 1 has the water supply pipe 3 connected thereto and a bottom water pipe 102 connected to the bottom and extending horizontally into a furnace chamber 103. Within this chamber is located the bottom 104 and a top 105, two upright branches 106, 106 of pipe 102 extending up through the bottom into the chamber and connecting with a pair of water jackets 107, 107 partly surrounding two gas burners 108, 108 spaced apart and disposed horizontally in mutual parallelism within the furnace or burner chamber. Each burner is fed with gas and air mixture from a pipe 109 supplied with gas by pipe 110 controlled by valve 111. Apertures 112, 112 allow the fuel mixture to escape upwardly and form flames 113, 113 which heat the burner chamber 103.

From the upper part of tank 1 a further water pipe 114 extends down into the burner chamber and is controlled by a valve 115, being connected within the chamber to one water jacket 107. This is connected to the second water jacket by an additional pipe 116 so that water heated by burners 108 within both jackets 107 will rise and pass into tank 1. Within the chamber 103 a further gas pipe 117 controlled by valve 118 has a pair of downwardly inclined jets 119, 119 directed toward the perforate tops of burners 108 to add their flames 120, 120, or form pilots for these burners, if so desired.

While the burners serve to heat the water jackets 107 and thereby provide hot water, I have also means included for providing the system with steam simultaneously. Thus, an upper horizontal pipe 121 is connected to the descending pipe 114 and extends into chamber 103 transversely above the burners and their jackets. Above these latter are connected two coil pipes 122, 122 to horizontal pipe 121, these pipes thereby connecting a pair of steam coils 123, 123 coiled about the burners and jackets to pipe 121, while the other lower ends 124, 124 of the same coils are connected to pipe 102 through the furnace bottom 104. The residual heat within the chamber 103 and the gas flames 113 heat the water in the coils 123 and alter the same to steam which passes through pipe 121 to pipe 114 and to the top of tank 1. The supply pipe 3 serves to supply the steam to the house, while the water intake pipe 125 serves for introducing water into the system as required, in the lower part of the tank.

By means of the system embodying my invention, it is easily possible to supply hot water and steam, and also in at least one form a supply of hot air, such multiple supply occurring simultaneously and from the same source of heat.

Manifestly, variations may be resorted to, and parts and features may be modified or used without others within the scope of the appended claims.

Having now fully described my invention, I claim:

1. A combined heater and steam generator including a fuel header disposed horizontally, a heater casing, the fuel header running through the latter and being exposed upon the upper side, a first water pipe connected to the lower part of the casing, a second pipe connected to the upper part of the casing, a branch pipe connected to the second pipe above the casing and extending wholly above said casing, a heating coil surrounding the latter and connected at one end to the first mentioned water pipe and at the other end to said branch pipe, and means interconnecting the first mentioned water pipe and the second pipe for promoting flow of fluid through the heating coil, said means being independent of the latter.

2. A combined heater and steam generator according to claim 1, wherein the means interconnecting the first mentioned water pipe and the second pipe includes a tank to which both pipes are connected at different levels.

3. A combined heater and steam generator including a fuel header disposed horizontally, a capacious heater casing, the fuel header extending horizontally through the heater casing and being exposed upon the upper side thereof, a first water pipe disposed wholly below the casing and connected to the lower part thereof, a second pipe extending to said casing and connected to the upper portion thereof, a horizontal branch pipe connected at one end to the second pipe and extending wholly above the top of said casing, a heating coil surrounding said casing and connected at one end to the first mentioned water pipe and at the other end to said branch pipe above the casing, and means interconnecting the first water pipe and the horizontal branch pipe independently of the second pipe.

4. A combined water heater and steam generator according to claim 3, including an upright recirculating device connected at the lower portion thereof to the first water pipe and at the upper portion thereof to the second pipe above the level of the branch pipe, and wherein the last mentioned means includes at least one substantially upright pipe directly interconnecting the first water pipe and the horizontal branch pipe.

5. A combined water heater and steam generator according to claim 4, wherein the connection of the one end of the heating coil is connected to the first water pipe at a point below the level of the casing and the other end of said heating coil is connected to the horizontal branch pipe at a point above the level of said casing.

References Cited in the file of this patent

UNITED STATES PATENTS

| | | |
|---|---|---|
| 848,564 | Mitchell | Mar. 26, 1907 |
| 2,541,245 | Halmasy | Feb. 13, 1951 |
| 2,581,189 | Hobbs | Jan. 1, 1952 |